United States Patent
Hudson (10) Patent No.: US 7,246,824 B2
(45) Date of Patent: Jul. 24, 2007

(54) LABELS AND METHOD OF FORMING THE SAME

(75) Inventor: Philip Hudson, Andover (GB)

(73) Assignee: Optaglio Limited, Swindon (GB)

( * ) Notice: Subject to any disclaimer, the term of this patent is extended or adjusted under 35 U.S.C. 154(b) by 752 days.

(21) Appl. No.: 10/297,267

(22) PCT Filed: Jun. 1, 2001

(86) PCT No.: PCT/GB01/02432

§ 371 (c)(1),
(2), (4) Date: Jun. 20, 2003

(87) PCT Pub. No.: WO01/93231

PCT Pub. Date: Dec. 6, 2001

(65) Prior Publication Data

US 2004/0020086 A1 Feb. 5, 2004

(30) Foreign Application Priority Data

Jun. 1, 2000 (GB) .................. 0013379.3

(51) Int. Cl.
G09F 3/02 (2006.01)
G09F 3/10 (2006.01)

(52) U.S. Cl. .................. 283/91; 283/86; 283/72; 428/198

(58) Field of Classification Search .................. 283/72, 283/81, 91, 94; 428/198, 915
See application file for complete search history.

(56) References Cited

U.S. PATENT DOCUMENTS

| 4,206,965 | A |   | 6/1980  | McGrew  |        |
|-----------|---|---|---------|---------|--------|
| 4,544,266 | A |   | 10/1985 | Antes   |        |
| 4,568,141 | A |   | 2/1986  | Antes   |        |
| 4,629,282 | A |   | 12/1986 | McGrew  |        |
| 5,101,184 | A |   | 3/1992  | Antes   |        |
| 5,138,471 | A |   | 8/1992  | McGrew  |        |
| 5,331,443 | A |   | 7/1994  | Stanisci|        |
| 5,447,335 | A | * | 9/1995  | Haslop  | 283/91 |

(Continued)

FOREIGN PATENT DOCUMENTS

DE       38 40 037 A1    5/1990

(Continued)

OTHER PUBLICATIONS

Bruckhardt, C.B., "Display of Holograms in White Light", The Bell System Technical Journal, Dec. 1966, pp. 1841-1844.

(Continued)

*Primary Examiner*—Dana Ross
(74) *Attorney, Agent, or Firm*—Townsend and Townsend and Crew LLP (57) ABSTRACT

The invention provides for a label such as a temper evident holographic or diffractive security label that consists of at least two separate microstructures (30, 31), one exhibiting a holographic or diffractive security image, the other a non visible non-diffractive structure which controls differential release of a reflector or semi reflector layer (27) to display a separate visual message upon removal of the label by tamper. The advantage over previous prior art devices is that both the diffractive message and the tamper evident message are encoded within the microstructure without any need for additional coating or print layers in the device.

23 Claims, 5 Drawing Sheets

U.S. PATENT DOCUMENTS

| | | |
|---|---|---|
| 5,461,239 A | 10/1995 | Atherton |
| 5,483,363 A | 1/1996 | Holmes et al. |
| 5,659,408 A | 8/1997 | Wenyon |
| 5,694,229 A | 12/1997 | Drinkwater |
| 5,815,292 A | 9/1998 | Walters |
| 5,825,475 A | 10/1998 | Formosa |
| 5,856,070 A | 1/1999 | Korth |
| 5,971,277 A | 10/1999 | Cragun et al. |
| 6,036,807 A | 3/2000 | Brongers |
| 6,062,604 A | 5/2000 | Taylor et al. |
| 6,088,161 A | 7/2000 | Lee |
| 6,157,474 A | 12/2000 | Orr et al. |
| 6,222,650 B1 * | 4/2001 | Long ............... 359/2 |
| 6,369,919 B1 * | 4/2002 | Drinkwater et al. ........ 359/2 |

FOREIGN PATENT DOCUMENTS

| | | |
|---|---|---|
| DE | 196 12 819 A1 | 10/1997 |
| EP | 0 919 961 A2 | 6/1999 |
| GB | 2 149 532 A | 6/1985 |
| GB | 2243139 * | 10/1991 |
| WO | WO 93 18419 A1 | 9/1993 |
| WO | WO 94 24615 A1 | 10/1994 |
| WO | WO 95 02200 A1 | 1/1995 |
| WO | WO 95 34008 A1 | 12/1995 |
| WO | WO 98 08691 A1 | 3/1998 |
| WO | WO 99 04364 A1 | 1/1999 |
| WO | WO 99 36271 A1 | 7/1999 |
| WO | WO 99 59036 A1 | 11/1999 |
| WO | WO 00 30043 A1 | 5/2000 |
| WO | WO 01/93231 * | 12/2001 |

OTHER PUBLICATIONS

Hariharan, P., "Colour Holography", *E. Wolf, Progress In Optics* vol. *XX*, p. 265-324, North-Holland, 1983, Oxford, Amsterdam New York, US.

Tedesco, James M., "Holographic Diffusers for LCD Cockpit Displays", Proceedings of the SPIE, SPIE, 1994, vol. 2219, pp. 327-337, Bellingham, VA, US.

* cited by examiner

LABELS AND METHOD OF FORMING THE SAME

The present invention relates to a label and method of forming the same and, in particular, but not exclusively, to a tamper evident security label such as a holographic label.

Known security labels consist of so-called void labels which have been back-printed, generally after metallisation to provide, for example, areas of differential adhesion of the metallisation to the adhesive layer. In the alternative a carrier layer is printed to provide differential release. That is in some areas, the bond to the carrier is greater than the bond to the adhesive so that upon removal, the aluminium adheres to the carrier. In areas where the bond of the aluminium (or other metallisation, e.g. copper) to the adhesive is greater than the bond to the carrier, portions of the metallisation are left on the adhesive layer and so remain on the substrate upon removal of the carrier. These differential tear effect areas can be used to reveal messages upon removal of the tamper evident label by leaving a variable metal pattern adhered to the adhesive on the article (e.g. void, chequerboard etc) thereby indicating tampering with the label.

Also in the art, the above type of printed void structure can also be used with holographic or other diffractive type security labels to provide a void type pattern in addition to a diffractive security type image by back printing the holographic structure or the post metallised structure with a release or adhesion layer.

As will be appreciated, a separate additional print stage is required to create the void message by addition of a release layer or similar structure.

It can also be noted in the prior art that, for example, the heavy exposure of dot matrix pixels serving to form a diffractive pattern microstructure can cause deep protrusions into, for example, on embossing lacquer causing the embossing lacquer to be disrupted near the carrier level trapping aluminium which is removed with the carrier. However, here any metal pattern left on the surface mirrors the graphical layout of the dot matrix microstructure, and any such pattern is in any case formed accidentally and arbitrarily.

Also on some other types of holographic security labels the nature of the optical microstructure can occasionally be seen to co-incidentally influence the adhesion of the metal in tamper evident labels such as embossed polypropylene where the degree of tamper evidence and metal retention in certain areas can occasionally be affected.

The present invention seeks to provide for a label and related method of label formation having advantages over known labels and methods and which is particular, provide for a simpler structure and method.

According to one aspect of the present invention there is provided a layered label having at least first and second layers separated by a layer of reflective material, the first layer being arranged for securing the label, and the surface of the second layer contacting the layer of reflective material exhibiting a microstructure having surface characteristics such that, if an upper layer of the label is removed, at least a portion of the reflective material at locations corresponding to the locations of the said microstructure are removed along with the removed layer and so as to expose a visible pattern in the remaining layer of the label.

It should be appreciated that the label may also contain additional layers, for example in the case of a embossing lacquer carried on a polyester or other form of base as known in the industry, though the invention here relates to the interface between the embossed surface, the reflector layer and the adhesive layer.

The use of surface relief micro-structures in certain areas whose presence provides variable metal adhesion on a metallised tamper evident label to reveal a hidden message upon removal serves to provide advantages over the known structure and methods.

Advantageously, two microstructures are provided and at least the second of which comprises a diffractive surface relief microstructure. Such two microstructures can be overlapping but are contained in distinct and separate interlocking pixel or fine line patterns. The microstructures can be used within a tamper evident label structure to induce an area of differential adhesion between a carrier layer and a metal layer such that on attempted removal of the tamper evident label, differential release of the metal reflector layer occurs to form a visual message (e.g. 'void ' type pattern message) which is revealed upon removal.

Advantageously, one microstructure exhibits a holographic or diffractive security image, while the other microstructure is a non visible non-diffractive structure which controls differential release of a reflector or semi reflector layer to display a separate visual message upon removal of the label by tamper. As an alternative, both microstructures can exhibit a holographic or diffractive image.

A particular advantage over prior art arrangement is that both the diffractive message and the tampered message are encoded within the microstructure without any need for additional coating or print layers in the device.

Preferably, the tamper evident holographic security device exhibits a first diffractive visual security image, such as a display hologram, this image being spatially confined within a first fine line or pixel structure on the surface of the device. As mentioned, the device also exhibits upon removal from the article a visual message located in the reflector (e.g. aluminium) or semi-reflector material left remaining on this device, this visual message being created from a second roughening or pit or very fine diffraction grating structure (this structure being non-visible and non-diffractive) confined within a second fine line or dot structure on the surface of the device. The purpose of the second structure is to affect the metal adhesion of the carrier surface so producing a differential release mechanism. Both of these fine line structures can be spatially interlocking on a small scale to apparently overlap microscopically without overlapping on a microscopic scale, with line-width and pixel size dimensions beneath the usual resolution limit of the human eye such that the interlocking line or dot pattern is not visible to an observer. The non-diffractive pattern thus produces a void type holographic tamper evident label without the need for any additional print stage of a release lacquer and allowing the voids pattern to be accurately registered with the holographic image.

According to another aspect of the present invention there is provided a layer member arranged to form part of a layered label, the said layer member having a surface arranged for contact with a layer of reflective material of the label, the said surface exhibiting a micro structure of a form not providing a diffractive image and exhibiting surface characteristics for controlling the selective removal of the reflective material from least portions of the reflective material at locations corresponding to the locations of the said microstructure.

According to yet another aspect of the present invention there is provided a method of forming a layered label having at least first and second layers separated by layer of reflective material, the first layer being arranged for securing the label to a surface, comprising the steps of forming a micro structure of a form not providing diffractive image in a surface of the second layer arranged for contact with the layer of reflective material, the microstructure exhibiting surface characteristics such. That, if an upper layer of the label is removed, at least portions of the reflective material at locations corresponding to the locations of the said microstructure re removed along with the removed layer and so as to expose visible pattern in the layer of the label remaining.

It should be appreciated that the term diffractive optical microstructure is intended to relate to security holograms, security diffractive devices based on diffraction gratings such as the devices known as 'kinegrams' or 'Exelegrams' (etc) which are originated mechanically or by electron beam origination, or so called dot matrix patterns as known in the art.

A further novel element in the present invention is to use the optical origination of the micro-structure in the holographic laboratory or, alternatively, in the direct write electron beam lithographic process or dot matrix process, to allow the tamper evident label to display one diffractive or holographic security image but also a different (totally different graphic) void security image by encoding the specific areas of the microstructure with particular types of surface relief patterns and properties incorporated within the origination This additional void type security image is advantageously stored by recording non diffractive pits or roughening into the microstructure at the origination stage at either recording optically or direct writing the origination master. This area will retain metal on removal of the carrier by tamper operating like a zipper structure. A useful piece of holographic origination technique can be seen on the holographic security device contained in the current UK £20 produced by the Bank of England Printing Works. There the holographic image is split into 2 sets of fine interlocking line structures, whose size is beneath the resolution of the human eye, on interlocking fine line area containing one graphical holographic image (e.g. Britannia) and the other area containing the other holographic structure replaying the second holographic image (numeral 20) the two structures being spatially isolated into independent areas to reduce image overlap and image degradation on hot foil application but using very fine non visible interlocking (interlocked) lines and such as described in W099/59086. Similarly the diffractive device used on American Express Travellers cheques (trade-marked 'Exelgram') consists of a very similar fine tracked structure used to create a diffractive device reproducing upon illumination two switching images where the origination has been created by electron beam writing of the structure. This is described in W095/04948.

A similar but distinct optical holographic or electron beam origination concept can be used to create an optical microstructure replaying both a visual holographic image in one pattern and containing a second microstructure consisting of a corrugated non diffracting microstructure capable of forming a void type image as detailed above when used in a tamper evident label. These two distinct types of structure are combined in two overlapping areas of the device, split either into interlocking fine lines or pixel type structures the key thing being that the dimensions of these meshing structures are beneath the resolution of human eye. In one of these distinct line areas a holographic or diffractive security image would be recorded using standard security holographic techniques. In the second, interlocking but spatially distinct area another optical exposure—generally to a dot pattern or roughening pattern—would record a set of non holographic roughened areas or pits into the graphical areas not covered by the previous holographic image to record the graphically different void pattern revealed only on removal of a label under tamper conditions. An advantageous technique would be to record all elements of both security hologram and void artwork in register in a multi-element Hi hologram (e.g. for discussion of the area 'Practical Holography', Graham Saxby, prentice Hall publisher or for example U.S. Pat. No. 5,483,363 and U.S. Pat. No. 5,694,229). On the holographic transfer stage into the photoresist medium to form the surface relief hologram at the first stage the holographic laboratory would first record the elements corresponding to the security hologram (with reference beam) to form this element—then the void pattern image would be recorded by exposing the photoresist to just the object beam of the void pattern to provide a d.c. etch of this pattern into the photo resist on development. The two patterns would be optimised by suitable balancing of the two exposure levels. An alternative to expose the second void pattern would be to create the first diffractive image with a standard two beam dot matrix exposure to give a visual variable diffractive dot matrix image and then do a second exposure stage of just one dot matrix type beam stopped and repeated but to a high exposure level to create the void image pattern by producing an exposure that upon development became a set of deep pits or holes in the structure to produce the trapping void pattern where aluminium would be trapped on removal in a non diffractive roughening pattern. Another way to create a suitable diffractive master would be to use electron beam lithography to direct write the structures, writing diffractive information into certain pixels or tracks and by writing non diffractive information to control reflector adhesion into other pixels or tracks.

In another embodiment of this invention both the pattern for the visual diffractive image and the pattern for the tamper evident message could be diffractive. In this case both patterns would contribute to the diffractive image but only a selected part of the diffractive pattern would control adhesion for the tamper evidenced message controlling reflector adhesion. This selected area of the diffractive pattern would be formed so as to be diffractive but also to have significantly different topological characteristics to the other diffractive areas contributing solely to the visual image normally by way of having a much deeper aspect ratio to the diffractive groove structure. This would not significantly change the diffractive image behaviour in comparison to other areas but would significantly change the microscopic surface topography and degree of binding of a reflector layer.

The invention is described further hereinafter, by way of example only, with reference to the accompanying drawings in which.

Figure 1:
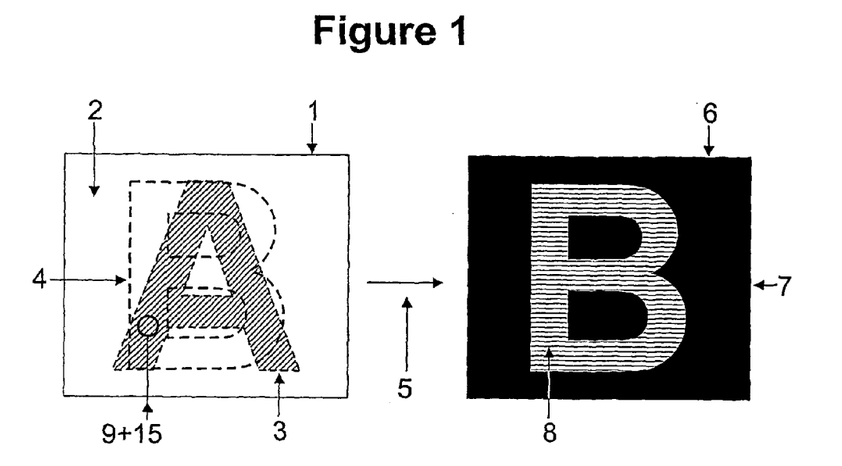
FIG. 1 illustrates a label and the different peritheral images presented by the label both before and after attempted tampering therewith.

FIG. 1 illustrates a tamper evident holographic security label 1, fully metallised with aluminium reflector or potentially partially reflective e.g. with a dot demetallisation process 2 and displaying a visual holographic security image 3 of the graphic 'A'. The second on-diffractive microstructure 4 is non visible on the undisturbed label. The arrow 5 indicates removal of the carrier layer by tamper to reveal a message of graphic 'B' 8 to indicate tamper on the metal reflector left adhering to the adhesive 7.

Figure 2:
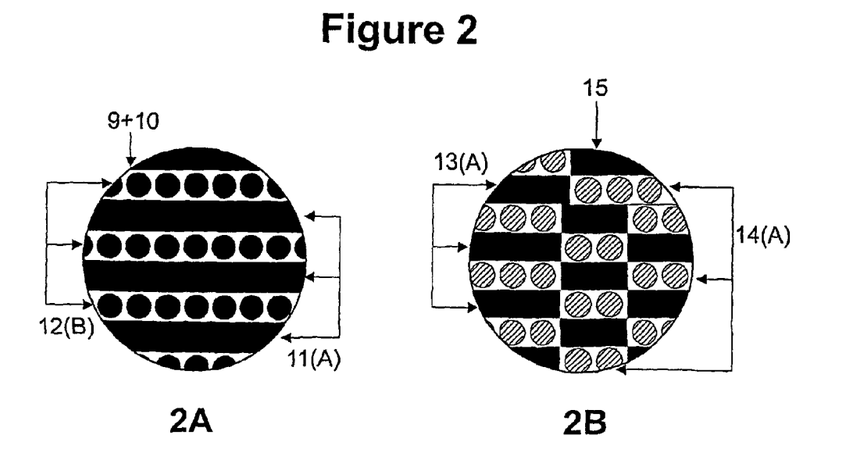
FIGS. 2A and 2B represent enlarged schematic views of the label of FIG. 1.

FIG. 2 illustrates enlargements of the area marked 9 and 15 on FIG. 1 to show the microscopic pattern. FIG. 2A shows the diffractive 11 and tamper indicating structures 12 recorded into separate interlocking line patterns of typical scale size 25 to 150 micron although larger sizes up to 300 microns could be used, FIG. 2b illustrates an alternative arrangement of interlocking pixel patterns.

Figure 3:
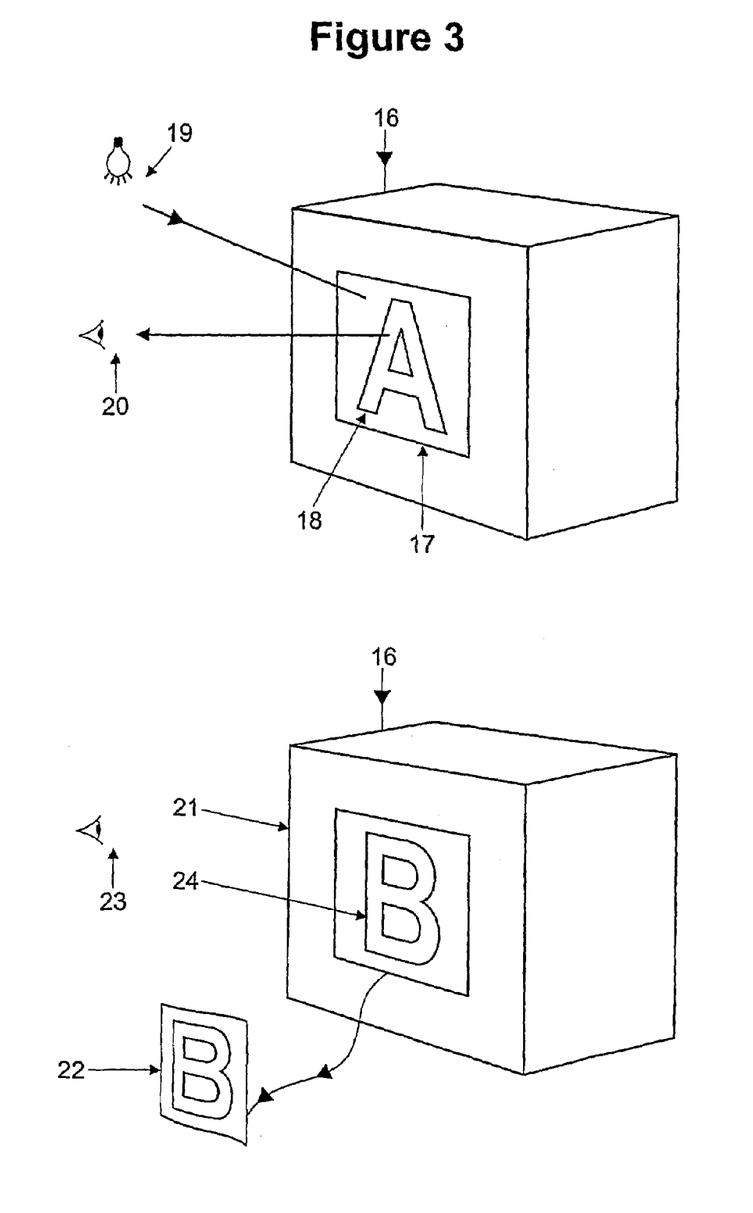
FIGS. 3A and 3B illustrate the manner in which a label according to the present invention can serve as a security label attached to a particular product;.

FIG. 3A illustrates a viewer authenticating the tamper indicating security label 17 displaying a visual diffractive security image 18, adhered to an item to be secured 16. FIG. 3B shows the situation after attempted removal of the security label where the tamper indicating message graphic 'B' 24 is left in the residual layer 21 on the item after the carrier layer 22 containing the microstructure is removed.

Figure 4:
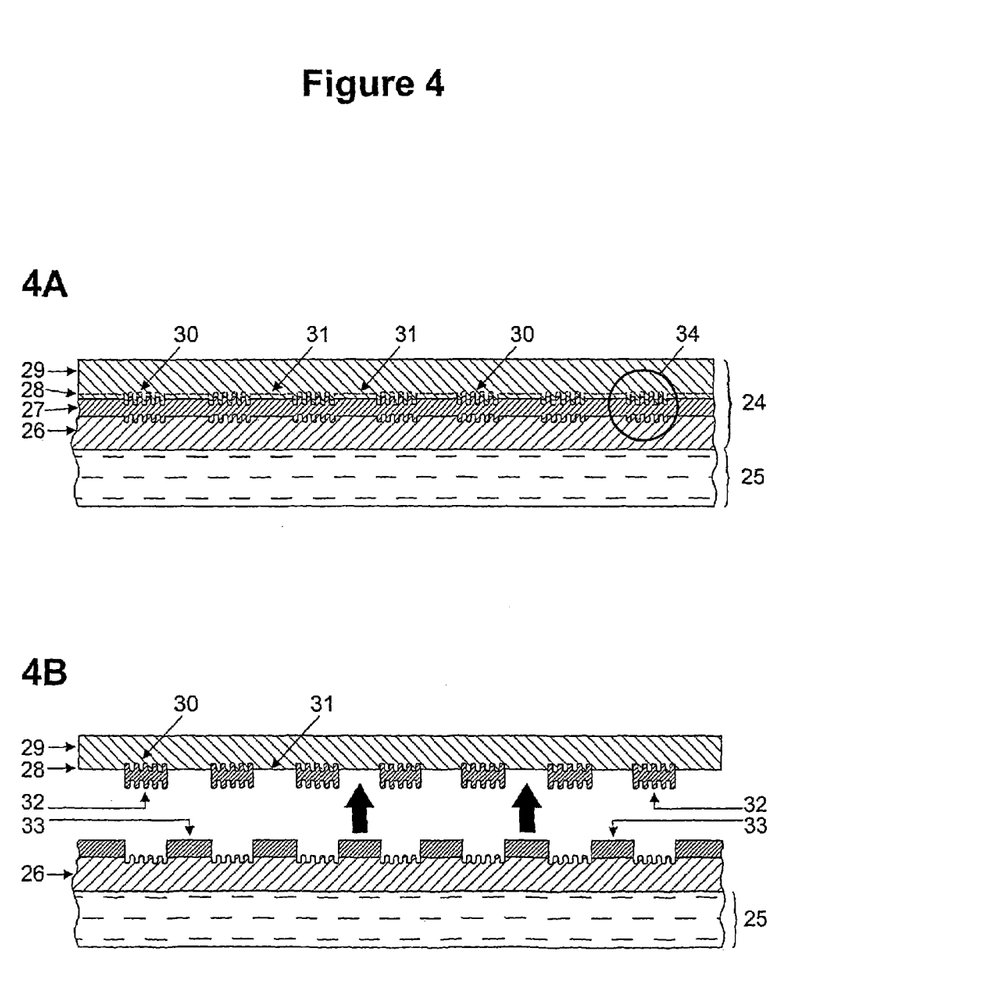
FIGS. 4A and 4B illustrate cross-sections through a label such as that illustrated with reference to FIG. 1.
Figure 6:
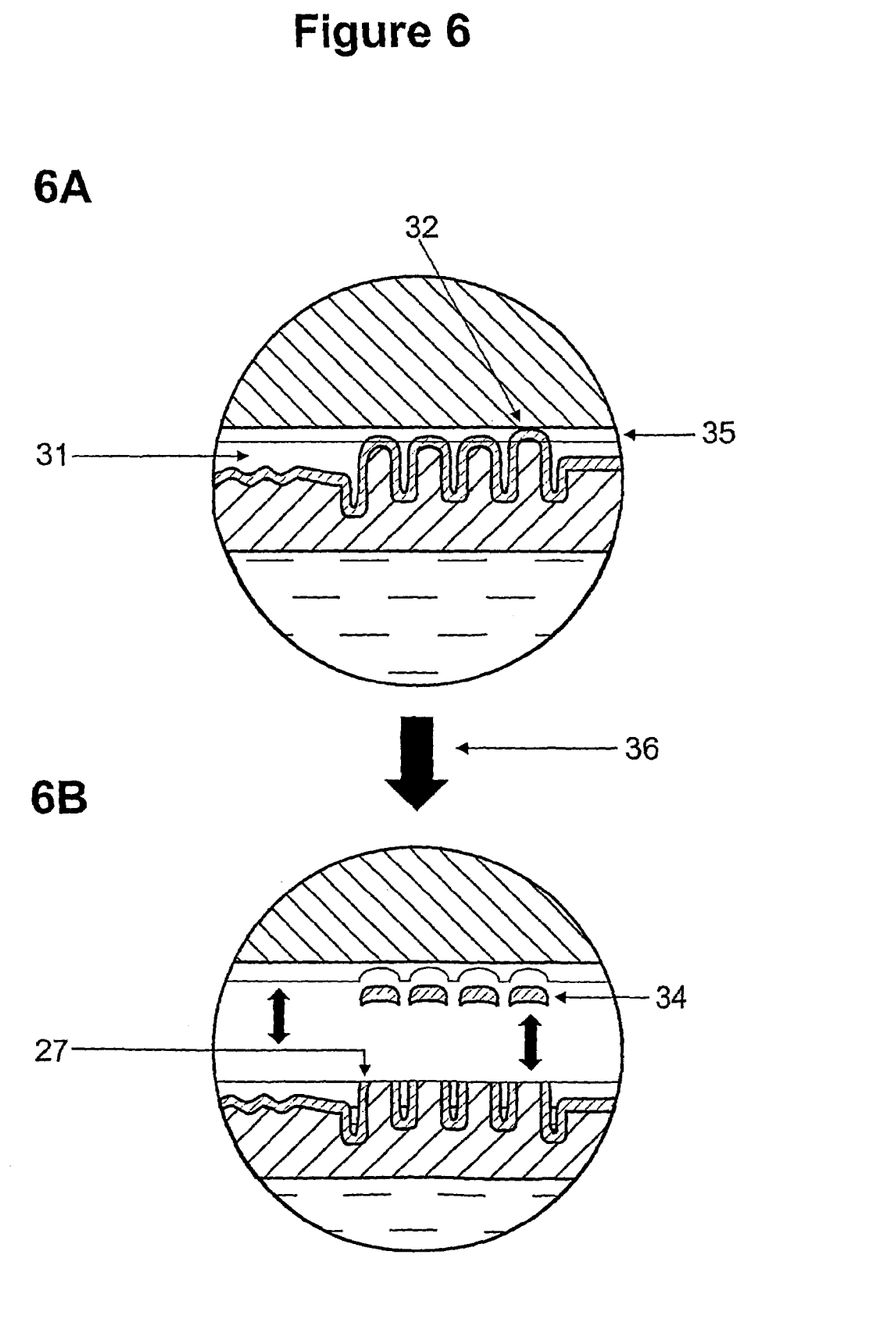
FIGS. 6A and 6B illustrate enlarged views of cross-sectional aspects of a label according to another embodiment of the present invention.

FIGS. 4A and 4B illustrates enlarged cross sections of the structure such devices both before 4A and after tamper 4B for example polypropylene and cover removal. The label includes embossed carrier layer 29, carrying surface relief emboss 28 consisting of diffractive visual pattern 31 and non diffractive tamper indicating pattern 30 located over an aluminium or similar reflector layer 27 and which is adhered to an article 25 by an adhesive layer 26. Optionally the surface relief is carried on an embossing lacquer layer 35 as described later with reference to FIG. 6. FIG. 4B illustrates how, after removal of the carrier layer 29 by tamper, portions 32 of the reflector layer 27 remain with the carrier 29 adhered into the non diffractive pattern forming areas 30 left on the reflector 32 and while other portions 33 remain adhered to the adhesive 26. This illustrates how the non diffractive layer promotes a differential pattern release by altering metal adhesion.

Figure 5:
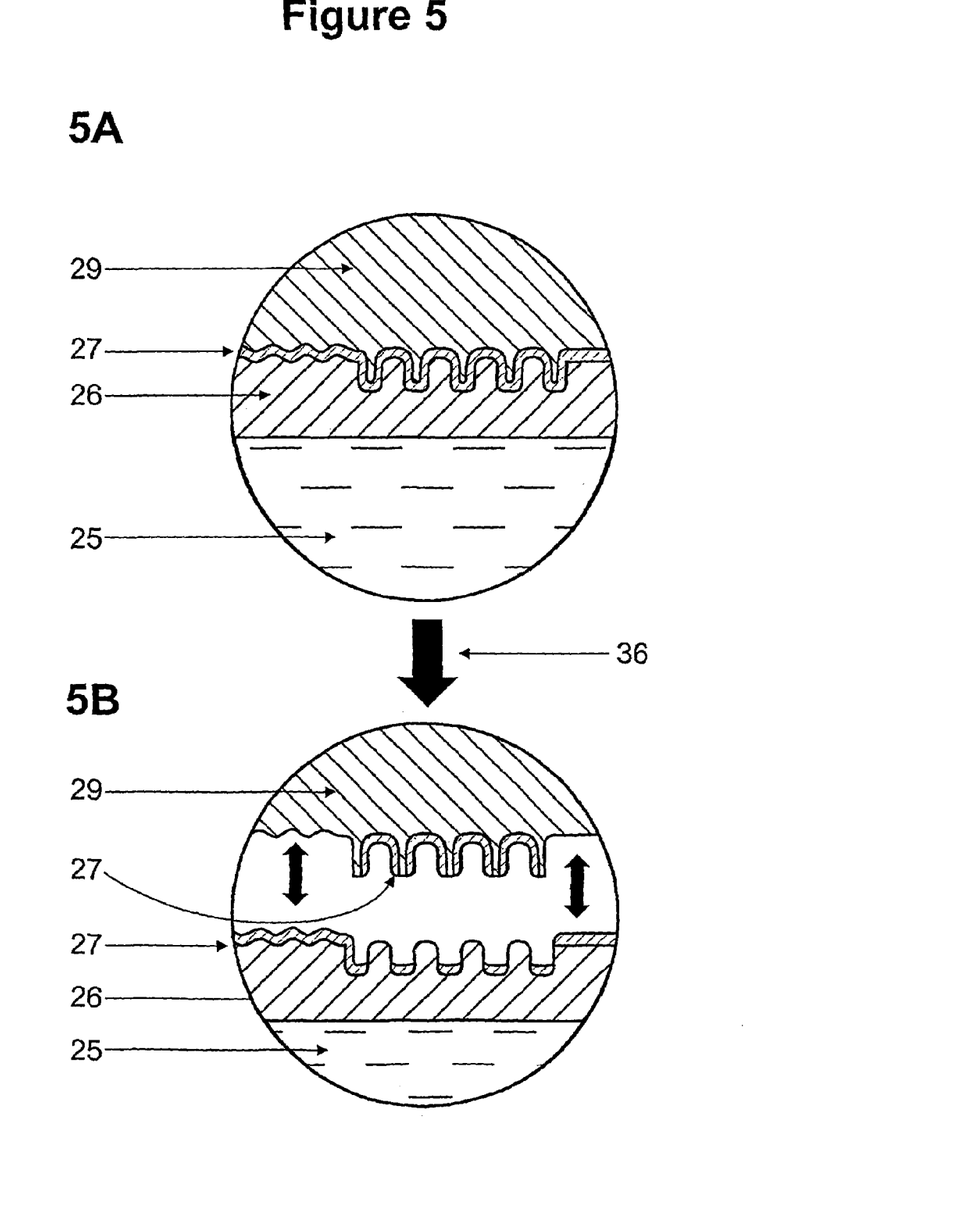
FIGS. 5A and 5B illustrate enlarged views of portions of the cross-sections of FIGS. 4A and 4B.

FIGS. 5A and 5B illustrate enlargements of the structure of regions of FIGS. 4A and 4B 34 illustrates an enlarged microscopic scale, the mechanism of differential release via different metal adhesions to different types of microstructure upon removal of the device. It is clearly seen how metal 27 can become trapped in deeper areas of one microstructure.

FIGS. 6A and 6B illustrate enlargements similar to those of FIGS. 5A and 5B, but wherein the differential release mechanism for an image is embossed into an intermediate embossing lacquer layer 31, optionally weakly bonded to a label carrier by a thin optional release layer 35.

As will be appreciated, the non-diffracting microstructure again serves to selectively control partial removal of the metal layer 27.

As will be appreciated, the invention provides a label offering a diffractive visual security image, such as a display hologram or diffraction grating security device, this image being spatially located within a first fine line or dot structure on the surface of the device. The device can exhibit upon removal from the article a visual message located in the reflector material left remaining on the device, this visual message being created by a differential release effect controlled by the selective micro-patterning of the non diffractive microstructure. The device therefore comprises a combination microstructure consisting of two discrete interlocking patterns of microstructure. The first pattern area contains a diffractive or holographic surface relief structure to provide a continuously visually viewable diffractive security image such as a security hologram, consisting of one set of discernible graphical images to form the visual diffractive security device providing secure authentication for the adhered label. The second pattern area or second microstructure contains an area of non diffractive roughness (such as microscopic pits in the surface or other roughness or shaped structures) designed to trap and retain aluminium or other metallisation upon removal of the label. These areas of microscopic roughness would be formed in another particular graphical pattern defining separate spatial regions on a small scale, normally not visually viewable in an undisturbed tamper evident label. Removal of a tamper evident label would normally involve a break at the carrier to embossing lacquer (and aluminium) bond for a label consisting of a cover and an embossing lacquer, and a break at the weak carrier to aluminium bond interface for a polypropylene type label causing in both cases a clear cover to be removed and metal left on the article. The metal is retained more by the pitted areas of the second microstructure and hence the metal would adhere more to the carrier in the areas where the microstructure had been micropitted or roughened would produce a differential tear effect and patterning. This would then result in a label where most of the label released from the aluminium except for patterned areas of microstructure defined in the second microstructure where the metal would remain adhered in the micropits of the carrier and be selectively removed with this so leaving a reversed out VOID type image in the metal left adhered the surface of the article corresponding to areas metal had been left on the carrier so indicating tamper evident (see figures and descriptions below).

By the term non diffractive pattern we mean an microscopic surface relief pattern that does not form a diffracted image upon illumination and therefore is not visible under normal viewing of the complete label. Such a pattern could be a microscopic random roughening of the surface (e.g. by exposure to a diffused laser beam or by writing a random pattern by electron beam lithography), it could be a non diffractive pit pattern of small dots (scale size 25 to 300 µm), it could be a set of small dots produced by exposure to the focussed light from an array of small lenses.

Those skilled in the optical and diffractive art will see other embodiments in which this may be achieved, e.g. by mechanically recombining on top of visual hologram void pit structure which are included within the scope of this invention.

After production of photoresist, as known in the art diffractive embossing shims can be made, via a sequential plating process and the patterns embossed into tamper evident material, say typically polypropylene. This can then be metallised, adhesive coated and die cut as known in the art to give tamper evident labels. In use when adhered to an article, the holographic security structure can diffract and provide visual security, whilst the void message structure (with a different graphic) being non-diffractive would be invisible until the label was tampered with. At this point of tamper and cover removal, metal in the holographic area would stay on the adhesive layer, whilst metal in the rough pitted areas of the void image would be removed on the carrier so revealing a totally separate, independent void message reversed out of the residue adhesive. This void effect can then be achieved without any additional coating or printing stages in the holographic product but by using a non diffractive microstructure combined into the origination and hence the embossing shim to create this effect. This effect also allows the void structure to be accurately located around or near the visual image structure to give additional register and potential patterning combinations in design.

Specifically the graphical images in the tamper evident area and the graphical images, geometric shapes, alphanumerics in the diffractive security structure can, in accordance with the present invention, be kept completely different with both messages being defined by the macroscopic graphical pattern of their respective microstructure alone in this case where the void microstructure is designed to adhere the metallic reflector to the tamper evident cover in the textured areas, whilst the holographic structure allows a release of the metal.

While reference is made to a label, it should be appreciated that, the label need not be an element discrete from, for example, product packaging but would itself form at least part of, for example, an article or product packaging.

The invention claimed is:

1. A layered label having at least first and second layers separated by a layer of reflective material, the first layer being arranged for securing the label, and the surface of the second layer contacting the layer of reflective material exhibiting a microstructure having surface characteristics such that, if an upper layer of the label is removed, at least a portion of the reflective material at locations corresponding to the locations of the said microstructure are removed along with the removed layer and so as to expose a visible pattern in the remaining layer of the label, wherein the microstructure comprises a second of two discrete microstructures, at least a first of the two discrete microstructures being arranged to offer a diffractive image when located on the layer of reflective material.

2. A label as claimed in claim 1, wherein the microstructure comprises an embossed surface of the second layer.

3. A label as claimed claim 1, wherein the microstructure is of a form not providing a diffractive image.

4. A label as claimed in claim 1, wherein the first and second microstructures are arranged to offer a diffractive image.

5. A label as claimed in claim 1, wherein the first and the second microstructures comprise discrete microstructure patterns.

6. A label as claimed in claim 5, wherein the discrete patterns comprise discrete fine line patterns.

7. A label as claimed in claim 5, wherein the discrete patterns comprise discrete pixel patterns.

8. A label as claimed in claim 5, wherein the discrete patterns are arranged to overlap on a macroscopic level but not at a microscopic level.

9. A label as claimed in claim 5, wherein the dimensions of each of the elements of the discrete patterns are just below the normal level of vision-resolution and are typically in the range of about 25-300 microns.

10. A label as claimed in claim 1, wherein the layer arranged to be removed from the label comprises the second layer such that the removal thereof serves to remove at least a portion of the reflective material underlying the micro structure.

11. A label as claimed in claim 1, wherein the second layer comprises a lacquer layer and the upper layer comprises a third layer.

12. A label as claimed in claim 11, wherein the lacquer layer is arranged to be removably bonded to the third layer by way of a relatively thin release layer.

13. A layer member arranged to form part of a layered label, the layer member having a surface arranged for contact with a layer of reflective material of the label, the surface exhibiting a microstructure of a form not providing a diffractive image and exhibiting surface characteristics for controlling the selective removal of the reflective material from at least portions of the reflective material at locations corresponding to the locations of the said microstructure, wherein the microstructure comprises a second of two discrete microstructures, a first of the two discrete microstructures being arranged to offer a diffractive image when located on the layer of reflective material.

14. A layer member as claimed in claim 13, wherein the microstructure comprises an embossed surface of the layer.

15. A layer member as claimed in claim 13, wherein the first and the second microstructures comprises discrete microstructure patterns.

16. A layer member as claimed in claim 15, wherein the discrete patterns comprise discrete fine line patterns.

17. A layer member as claimed in claim 15, wherein the discrete patterns comprise discrete pixel patterns.

18. A layer member as claimed in claim 15, wherein the discrete patterns are arranged to overlap on a macroscopic level but not at a microscopic level.

19. A layer member as claimed in claim 15, wherein the dimensions of each of the elements of the discrete patterns are just below the normal level of vision-resolution and are typically in the range of about 25-300 microns.

20. A method of forming a layered label having at least first and second layers separated by a layer of reflective material, the first layer being arranged for securing the label to a surface, comprising the steps of forming a microstructure in a surface of the second layer arranged for contact with the layer of reflective material, the microstructure exhibiting surface characteristics such that, if an upper layer of the label is removed, at least portions of the reflective material at locations corresponding to the locations of the said microstructure are removed along with the removed layer and so as to expose a visible pattern in the layer of the label remaining, wherein the microstructure is formed as a second of two discrete microstructures, at least a first of the two discrete microstructures being formed to offer a diffractive image when located on the layer of reflective material.

21. A method as claimed in claim 20, wherein the microstructure is formed by embossing the said surface of the second layer.

22. A method as claimed in claim 20, wherein the microstructure pattern is initially formed by means of a holographic process.

23. A method as claimed in claim 20, wherein the step of forming a microstructure in a surface of the second layer may be performed by any one of a diffused laser beam, electron beam lithography or a two-stage optical technique.

* * * * *